R. F. WILLIAMS.
Tree-Protector.

No. 165,776.

Patented July 20, 1875.

WITNESSES
C. A. Pease
Geo. H. Earl

INVENTOR.
Robert F. Williams
Per Brown Brothers
Attorneys

UNITED STATES PATENT OFFICE.

ROBERT F. WILLIAMS, OF HAMPTON, NEW HAMPSHIRE.

IMPROVEMENT IN TREE-PROTECTORS.

Specification forming part of Letters Patent No. 165,776, dated July 20, 1875; application filed May 26, 1874.

*To all whom it may concern:*

Be it known that I, ROBERT F. WILLIAMS, of Hampton, in the county of Rockingham and State of New Hampshire, have invented an Improved Tree-Protector, of which the following is a specification:

This invention relates to an improved arrangement for the protection of trees, &c., from injury or destruction by canker-worms or other insects of similar nature; and the invention consists of a trough or gutter of metal or other suitable material, to hold kerosene or similar oil, surrounding the tree, but with a space all around the tree, between it and the tree, the outer walls of the trough rising higher than the inner walls, and which supports a cover having an opening in the center somewhat larger than the diameter of the tree, which is to be filled with an elastic cement, such as resin, &c., to allow for the growth of the tree. From these outer walls extend rods or wires to and into the tree as a means of support to the trough.

Figure 1:
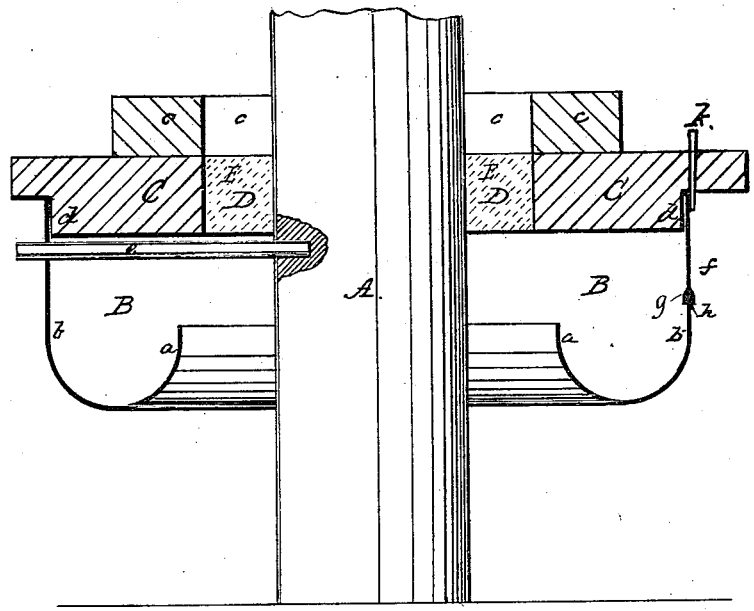
Figure 2:
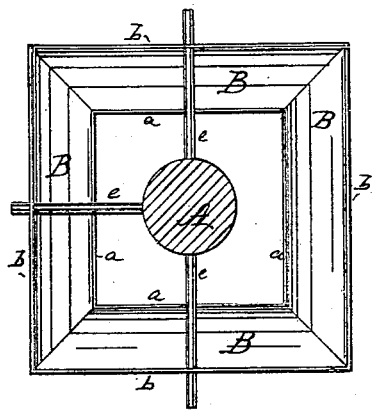

In the accompanying plate of drawings, my invention is illustrated, Figure 1 being a central vertical transverse section, and Fig. 2 plan view.

A represents the trunk of a tree; B, the trough. This trough B, in the present instance, is constructed in the form of a hollow square, with the tree A in the center. The outer walls $b$ are higher than its inner walls $a$, and on which rests the cover C. The cover C is made of two pieces secured together when in position by two cross-bars, $c$. A shoulder, $d$, extends below the bottom of the cover, fitting in between the outer walls $b$, to prevent it from moving. The middle of the cover is cut away, leaving a space, D, between it and the tree. In this space D is put an elastic cement, E, such as resin, &c., which yields to the growth of the tree. From the outer walls $b$ are three rods, $e$, extending from the three sides over the inner walls, and are driven or otherwise into the tree, these rods $e$ supporting the trough and cover in its position around the tree. On one of the sides of the trough the outer wall $b$ is a little lower than the other three sides, to serve as an opening to pour in the oil, or clean the trough when necessary. When the trough is filled a strip, $f$, having a groove, $h$, on its bottom edge $g$, fits over the outer wall, and is held in position against the shoulder $d$ of the cover by a pin, $k$, extending through the edge of the cover, or in any other proper manner. The cover is flanged to overlap the trough B, and is constructed with a central opening or space, D, into which an elastic substance, E, is placed, which will prevent injury to the tree in its expansion, as it will prevent the tree from injuring the cover in its expansion or growth, and obviates the necessity of changing or altering the cover from same reason.

The cover not only serves, in-combination with the trough, to protect the tree from the ascent above it of the worms that would injure the tree, but also prevents dirt and the rain or wind from entering the trough and disturbing the oil, &c.

The worm in the ascent of the tree comes to the cement or cover, and is thus stopped in its progress upward. It then naturally moves along the bottom of the cover until it reaches the outer wall of the trough, and, descending the inside of the wall, arrives at the oil in the trough, and as it cannot cross over the oil, obviously the tree is protected from injury by the worm.

The trough B, in lieu of being square as described, may be annular, or of any other form desired.

Having thus described my invention, what I claim, and desire to secure by Letters Patent, is—

The combination, substantially as herein shown and described, of the trough B, having the walls $a\ b$, flanged cover C, with a central opening or space, D, and supporting-rods $e$, and the elastic substance E filled into the space D, for the purpose described.

The above specification of my invention signed by me this 21st day of February A. D. 1874.

R. F. WILLIAMS.

Witnesses:
 EDWIN W. BROWN,
 C. A. PEASE.